United States Patent
Tang et al.

(10) Patent No.: US 11,025,148 B2
(45) Date of Patent: Jun. 1, 2021

(54) VIBRATION MOTOR

(71) Applicant: AAC ACOUSTIC TECHNOLOGIES (SHENZHEN) CO., LTD., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 99 days.

(21) Appl. No.: 16/527,013

(22) Filed: Jul. 30, 2019

(65) Prior Publication Data

US 2020/0044535 A1 Feb. 6, 2020

(30) Foreign Application Priority Data

Aug. 3, 2018 (CN) .......................... 201821255456.2

(51) Int. Cl.
*H02K 33/12* (2006.01)
*B06B 1/04* (2006.01)

(52) U.S. Cl.
CPC .............. *H02K 33/12* (2013.01); *B06B 1/045* (2013.01)

(58) Field of Classification Search
CPC ......... B06B 1/045; H02K 33/12; H02K 33/16
USPC .......................................................... 310/15
See application file for complete search history.

(56) References Cited

U.S. PATENT DOCUMENTS

| | | | | |
|---|---|---|---|---|
| 6,747,631 B1* | 6/2004 | Sakamaki | ................ | G01L 1/14 345/157 |
| 8,269,379 B2* | 9/2012 | Dong | ..................... | H02K 33/16 310/25 |
| 2011/0001365 A1* | 1/2011 | Park | ...................... | H02K 33/16 310/17 |
| 2011/0062804 A1* | 3/2011 | Lee | ........................ | H02K 33/18 310/30 |
| 2011/0204732 A1* | 8/2011 | Miyamoto | ............ | H02K 33/16 310/25 |
| 2013/0119785 A1* | 5/2013 | Han | ........................ | G02B 7/102 310/12.16 |
| 2013/0193779 A1* | 8/2013 | Kuroda | .................. | H02K 33/16 310/15 |

(Continued)

FOREIGN PATENT DOCUMENTS

EP          3410586 A1 * 12/2018   ............. B06B 1/045

*Primary Examiner* — Alex W Mok
(74) *Attorney, Agent, or Firm* — W&G Law Group LLP

(57) ABSTRACT

A vibration motor includes a housing, a vibrator, a driving apparatus, and an elastic part. The housing includes a top wall, a bottom wall and a side wall. The vibrator includes a counterweight block and magnet steels disposed in the counterweight block. The vibration motor further includes a hollow portion penetrating through the counterweight block from an upper surface toward a lower surface, and inner walls defining the hollow portion. The driving apparatus is disposed in the hollow portion and drives the counterweight block to vibrate in vibrate directions parallel to the bottom wall. The inner walls include a first and a second inner wall, the magnet steels include a first magnet steel disposed on the first inner wall and a second magnet steel disposed on the second inner wall, which interact with the driving apparatus respectively to drive the vibrator to vibrate along the two vibrate directions.

11 Claims, 4 Drawing Sheets

(56) References Cited

U.S. PATENT DOCUMENTS

| | | | |
|---|---|---|---|
| 2014/0084710 A1* | 3/2014 | Endo | B06B 1/045 |
| | | | 310/25 |
| 2015/0207392 A1* | 7/2015 | Iwakura | H04R 11/02 |
| | | | 310/25 |
| 2016/0013710 A1* | 1/2016 | Dong | H02K 33/16 |
| | | | 310/25 |
| 2016/0226363 A1* | 8/2016 | Mao | H02K 33/16 |
| 2017/0012516 A1* | 1/2017 | Xu | H02K 11/30 |
| 2017/0033663 A1* | 2/2017 | Wang | H02K 33/12 |
| 2017/0033673 A1* | 2/2017 | Wang | H02K 33/16 |
| 2017/0110920 A1* | 4/2017 | Mao | H02K 33/16 |
| 2017/0144191 A1* | 5/2017 | Mao | B06B 1/045 |
| 2018/0026514 A1* | 1/2018 | Mao | H02K 5/04 |
| | | | 310/12.16 |
| 2018/0115231 A1* | 4/2018 | Xu | H02K 5/04 |
| 2018/0297061 A1* | 10/2018 | Mao | H02K 5/04 |
| 2018/0342937 A1* | 11/2018 | Mao | H02K 33/02 |
| 2019/0157958 A1* | 5/2019 | Mao | H02K 33/12 |
| 2020/0044533 A1* | 2/2020 | Tang | H02K 33/12 |
| 2020/0044536 A1* | 2/2020 | Tang | H02K 33/12 |
| 2020/0044539 A1* | 2/2020 | Tang | H02K 33/14 |
| 2020/0044540 A1* | 2/2020 | Tang | H02K 33/16 |
| 2020/0044546 A1* | 2/2020 | Zhang | H02K 33/16 |
| 2020/0044548 A1* | 2/2020 | Tang | H02K 33/18 |
| 2020/0195115 A1* | 6/2020 | Zhang | H02K 33/16 |
| 2020/0195116 A1* | 6/2020 | Zhang | H02K 33/18 |
| 2020/0212774 A1* | 7/2020 | Ling | B06B 1/045 |

* cited by examiner

VIBRATION MOTOR

TECHNICAL FIELD

The present disclosure relates to the field of vibration motors, and in particular, to a linear vibration motor that linearly vibrates.

BACKGROUND

With the development of electronics technologies, portable consumer electronic products such as mobile phones, handheld game consoles, navigation apparatuses or handheld multimedia entertainment devices become increasingly popular among people. Linear vibration motors are usually used in these electronic products to provide system feedbacks such as call alerts, message alerts, and navigation alerts of mobile phones and vibration feedbacks of game consoles. Such wide application requires that vibration motors have high performance and long service life.

A vibration motor generally includes a housing having an accommodation space, a vibrator accommodated in the accommodation space, and an elastic part connecting the housing and the vibrator. The elastic part supports the vibrator to move reciprocally in the housing to vibrate. The vibration motor in the prior art generally can implement vibration in one direction, and consequently, a range of vibration frequency is limited, and a vibration effect is not enough to meet a requirement.

Therefore, a new vibration motor needs to be provided to resolve the foregoing problems.

DETAILED DESCRIPTION

The present disclosure is further described below with reference to the accompanying drawings.

Embodiment 1

Figure 1:
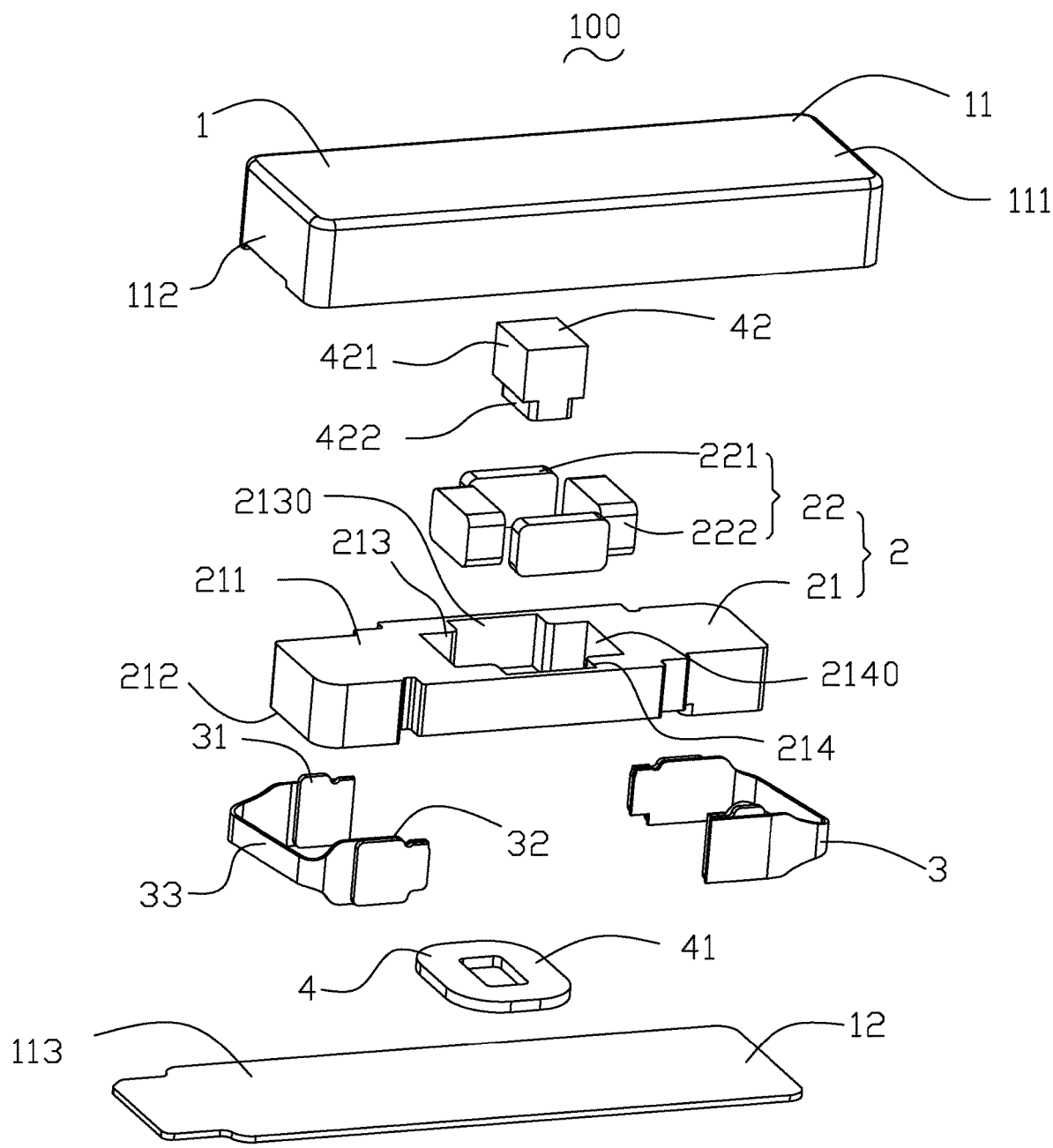
FIG. 1 is an exploded schematic structural diagram of a vibration motor according to the present disclosure.
Figure 2:
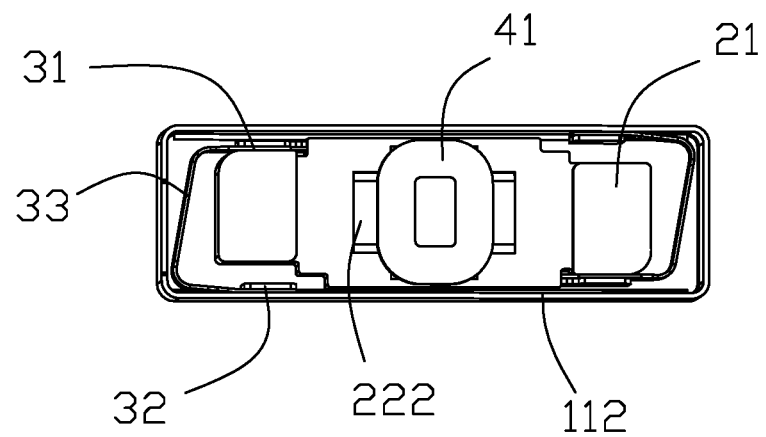
FIG. 2 is a partially assembled schematic structural diagram of a vibration motor according to the present disclosure.

As shown in FIG. 1 and FIG. 2, the present disclosure provides a vibration motor 100, includes a housing 1, a vibrator 2 accommodated in the housing 1, an elastic part 3 elastically supporting the vibrator 2, and a driving apparatus 4 driving the vibrator 2 to vibrate along a vibrate direction.

The housing 1 includes a top wall 111, a bottom wall 113 disposed opposite the top wall and a side wall 112 connecting the top wall 111 and the bottom wall 113. Specifically, in this embodiment, the housing 1 includes a cover plate 11 including the top wall 111 and the side wall 112, and a bottom plate 12 covering the cover plate 11 and forming an accommodation space with the top wall 111; the bottom plate 12 serves as the bottom wall 113. The driving apparatus 4 is fixed on the housing 1, one end of the elastic part 3 is connected to the vibrator 2 and the other end of the elastic part 3 is connected to the side wall 112 of the housing 1.

The driving apparatus 4 specifically includes a coil 41 disposed on the housing 1 and an iron core 42 corresponding to the coil 41. The coil 41 may be disposed on the top wall 111 or be disposed on the bottom wall 113. The vibrator 2 includes a magnet steel 22 corresponding to the coil 41 and the iron core 42. The coil 41 is driven by a Lorentz force in a magnetic field during electrification and drives the vibrator 2 to vibrate in a direction parallel to the bottom wall 113. The coil 41 may be disposed on the top wall 111 or be disposed on the bottom wall 113. Specifically, in this embodiment, the coil 41 is a flat coil attached to the bottom wall 113 of the housing 1. The iron core 42 includes a main body portion 421 and a fixed end 422 extending from the main body portion 421 toward the coil 41, the coil 41 sleeves over the fixed end 422. During electrification, the magnetic field is formed between the coil 41 and the iron core 42, and attraction and repulsion with the magnet steel 22 of the vibrator 2 drive the vibrator 2 to vibrate. Certainly, only an optimal embodiment of the present disclosure is described above, and in another alternative embodiment, a driving apparatus with another structure may also be used. For example, a plurality of coils may be disposed, or an electromagnet may be disposed, provided that a driving apparatus that is fixed on the housing and that drives the vibrator to vibrate.

The vibrator 2 includes a counterweight block 21 and the magnet steel 22 disposed in the counterweight block 21. Specifically, in this embodiment, the counterweight block 21 includes an upper surface 211 corresponding to the top wall 111, a lower surface corresponding to the bottom wall 113, and a hollow portion running through the counterweight block 21 from the upper surface 211 toward the lower surface 212. An inner wall defining the hollow portion is formed in the counterweight block 21, the inner wall is connected to the upper surface 211 and the lower surface 212 respectively, and the inner wall encloses the hollow portion. The coil 41 of the driving apparatus 4 is around the iron core 42, the iron core 42 extends to the hollow portion, opposite the inner wall of the hollow portion and spaces from the inner wall. The vibrate direction includes a first direction and a second direction that are not parallel to each other. The inner wall include a first inner wall 213 disposed perpendicular to the first direction and a second inner wall 214 disposed perpendicular to the second direction. Preferably, the first direction is perpendicular to the second direction. In this embodiment, the two directions are indicated as a length direction and a width direction of the housing 1 respectively. The magnet steel 22 include a first magnet steel 221 disposed on the first inner wall 213 and a second magnet steel 222 disposed on the second inner wall 214. The first magnet 221 interacts with the driving apparatus 4 to drive the vibrator 2 to vibrate along the first direction (that is, along the width direction of the housing 1), and the second magnet 222 interacts with the driving apparatus 4 to drive the vibrator 2 to vibrate along the second direction (that is, along the length direction of the housing 1). Further, the first inner wall 213 is provided with a first fixing groove 2130 recessed in a direction away from the iron core 42, the first magnet steel 221 is disposed in the first fixing groove 2130; the second inner wall 214 is provided with a second fixing groove 2140 recessed in a direction away from the iron core 42, and the second magnet steel 222 is disposed in the second fixing groove 2140. Preferably, there are two first magnet steels 221 and two second magnet steels 222, so that the first magnet steel 221 and the second magnet steel 222 are disposed around the iron core 42, and a distance between the first magnet steel 221 and the iron core 42 and a distance between the second magnet steel 222 and the iron core 42 are greater than a maximum amplitude of the vibrator, so that during vibration of the vibrator 2, the iron core 42 moves relatively between the two first magnet steels 221 and the two second magnet steels 222. The driving apparatus 4 can cause the vibrator to form resonance along the first direction under the influence of two first magnet steels 221, and the driving apparatus 4 can cause the vibrator to form resonance along the second direction under the action of two second magnet steels 222, thereby broadening a range of vibration frequency of the vibration motor and enhancing a vibration effect.

Figure 3:
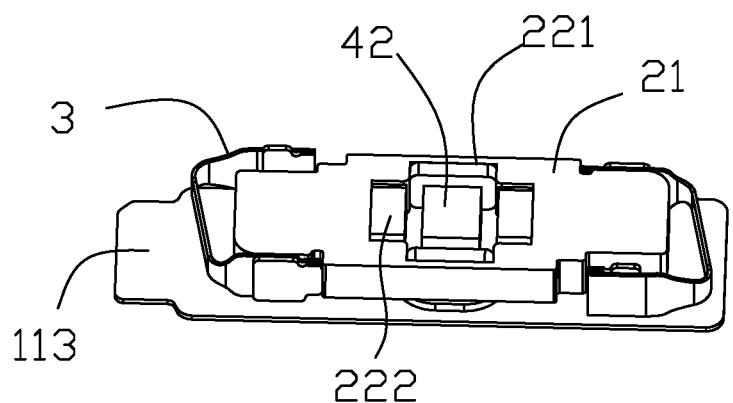
FIG. 3 is a partially assembled schematic structural diagram of a vibration motor according to the present disclosure.

Referring to FIG. 2 and FIG. 3, the elastic part 3 includes two C-type springs with opening directions opposite each other. specifically, the elastic part 3 includes a first fixed portion 31 connected to the counterweight block 21 of the vibrator 2, a second fixed portion 32 connected to the side wall 112, and a connecting portion 33 connecting the first fixed portion 31 and the second fixed portion 32. A length of the first fixed portion 31 is less than a length of the second fixed portion 32.

Different magnet steels are disposed on different inner walls, so that two resonators can be formed in two different directions, thereby implementing dual-resonator vibration. In particular, in this embodiment, the vibrate directions are perpendicular to each other.

Embodiment 2

Figure 4:
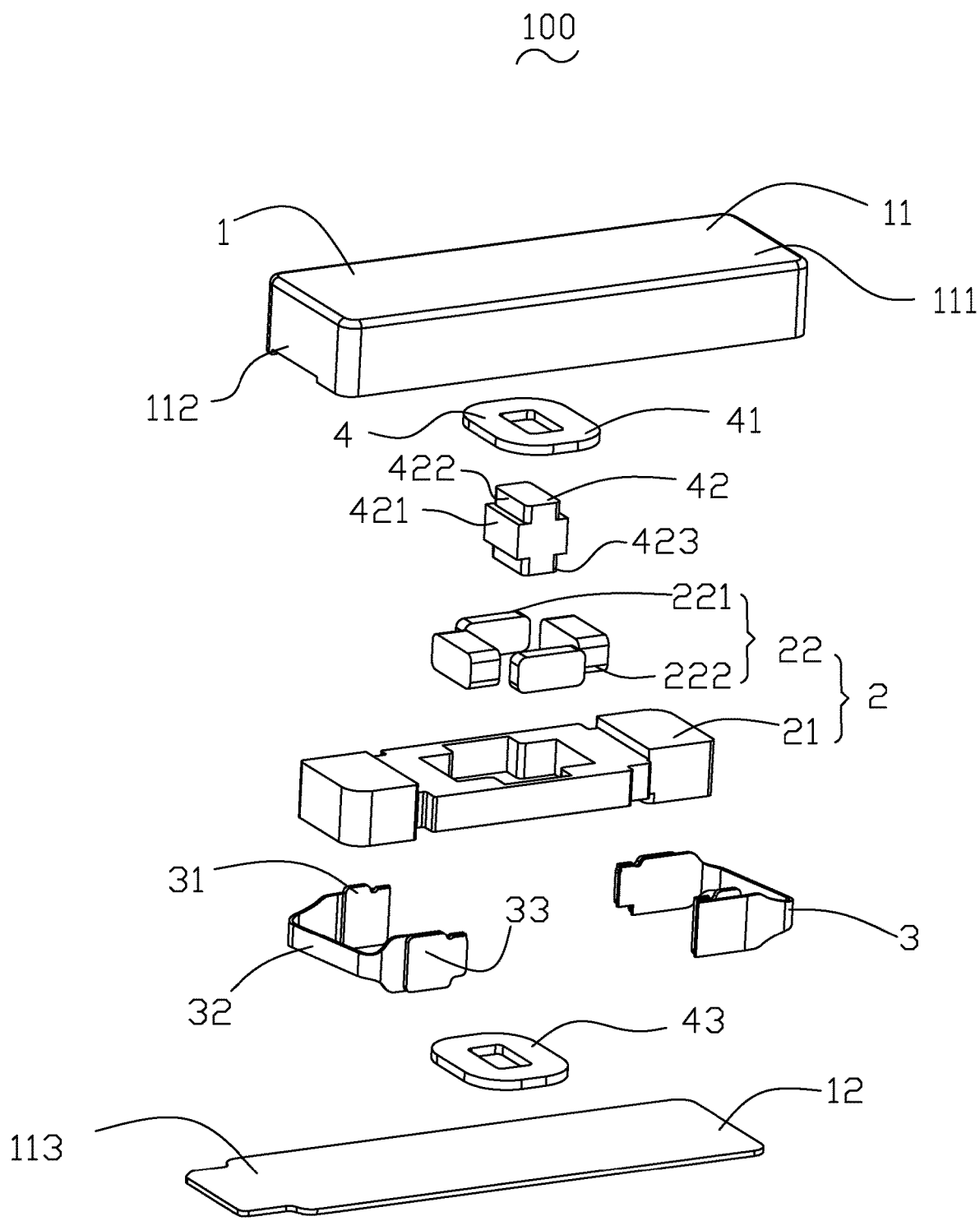
FIG. 4 is an exploded schematic structural diagram of another embodiment of a vibration motor according to the present disclosure.
Figure 5:
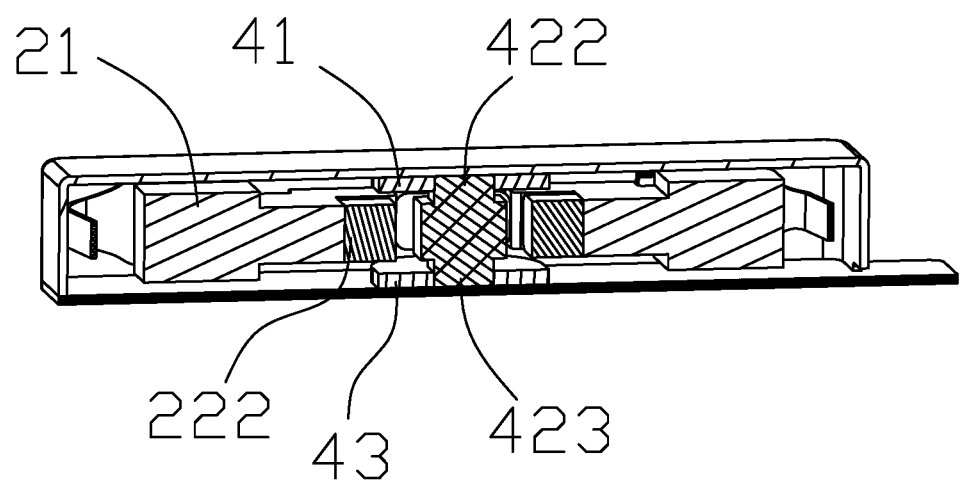
FIG. 5 is a sectional view of another embodiment of a vibration motor according to the present disclosure.

FIG. 4 and FIG. 5 show a second embodiment of the present disclosure. The second embodiment is roughly the same as the first embodiment, and a difference only lies in that, in this embodiment, there are two coils, including a first coil 41 disposed on the top wall 111 and a second coil 43 disposed on the bottom wall 113. Correspondingly, the iron core 42 includes a main body portion 421 disposed in the hollow portion, a first fixed end 422 extending from the main body portion 421 toward the top wall 111, and a second fixed end 423 extending from the main body portion 421 toward the bottom wall 113. The first coil 41 is sleeved over the first fixed end 422, and the second coil 43 is sleeved over the second fixed end 423. During electrification, the magnetic field is formed between the coils 41 and the iron core 42, and attraction and repulsion with the magnet steel 22 of the vibrator 2 drive the vibrator 2 to vibrate. The magnetic field of the vibration motor in this embodiment is more uniform compared with that of the first embodiment, a driving force is more stable, and a vibration induction is better.

The vibration motor in the present disclosure includes the housing, the vibrator accommodated in the housing, the driving apparatus driving the vibrator to vibrate, and the elastic part elastically supporting the vibrator. The housing includes a top wall, a bottom wall disposed opposite the top wall, and a side wall connecting the top wall and the bottom wall. The vibrator includes a counterweight block and magnet steels disposed on the counterweight block. The counterweight block includes an upper surface corresponding to the top wall and a lower surface corresponding to the bottom wall. The vibration motor further includes a hollow portion running through the counterweight block from the upper surface toward the lower surface, the counterweight block is correspondingly formed with inner walls defining the hollow portion, and the inner walls are connected to the upper surface and the lower surface. The driving apparatus is disposed in the hollow portion and drives the counterweight block to vibrate in a vibrate direction parallel to the bottom wall, and the vibrate direction include a first direction and a second direction not parallel to each other. The inner walls include a first inner wall disposed perpendicular to the first direction and a second inner wall disposed perpendicular to the second direction, the magnet steels include a first magnet steel disposed on the first inner wall and a second magnet steel disposed on the second inner wall. The first magnet steel interacts with the driving apparatus to drive the vibrator to vibrate along the first direction, and the second magnet steel interacts with the driving apparatus to drive the vibrator to vibrate along the second direction. Different magnet steels are disposed on different inner walls, so that two resonators can be formed in two different directions, thereby implementing dual-resonator vibration.

Although the embodiments of the present disclosure are shown and described above, it can be understood that the embodiments are exemplary and cannot be construed as limitations to the present disclosure, and a person of ordinary skill in the art can make changes, modifications, replacement, and variations to the embodiments within the scope of the present disclosure.

What is claimed is:

1. A vibration motor, comprising a housing, a vibrator accommodated in the housing, a driving apparatus driving the vibrator to vibrate, and an elastic part elastically supporting the vibrator;
    wherein the housing comprises a top wall, a bottom wall disposed opposite the top wall, and a side wall connecting the top wall and the bottom wall;
    wherein the vibrator comprises a counterweight block and magnet steels disposed in the counterweight block;
    wherein the counterweight block comprises an upper surface corresponding to the top wall and a lower surface corresponding to the bottom wall;
    wherein the vibration motor further comprises a hollow portion penetrating through the counterweight block from the upper surface toward the lower surface, the counterweight block is correspondingly formed with inner walls defining the hollow portion, and the inner walls are connected to the upper surface and the lower surface;
    wherein the driving apparatus is disposed in the hollow portion and is used to drive the counterweight block to vibrate in vibrate directions parallel to the bottom wall; the vibrate directions comprise a first direction and a second direction not parallel to each other; and the inner walls comprise a first inner wall disposed perpendicular to the first direction and a second inner wall disposed perpendicular to the second direction;
    wherein the magnet steels comprise a first magnet steel disposed on the first inner wall and a second magnet steel disposed on the second inner wall, the first magnet steel is used to interact with the driving apparatus to drive the vibrator to vibrate along the first direction, and the second magnet steel is used to interact with the driving apparatus to drive the vibrator to vibrate along the second direction.

2. The vibration motor according to claim 1, wherein the first inner wall is provided with a first fixing groove recessed in a direction away from the driving apparatus, and the first magnet steel is disposed in the first fixing groove; the second inner wall is provided with a second fixing groove recessed in a direction away from the driving apparatus, and the second magnet steel is disposed in the second fixing groove.

3. The vibration motor according to claim 1, wherein the driving apparatus comprises a coil disposed on the top wall and/or the bottom wall and an iron core disposed corresponding to the coil, the coil is wound around the iron core, the iron core extends to the hollow portion, and the first magnet steel and the second magnet steel are disposed around the iron core and spaced from the iron core.

4. The vibration motor according to claim 3, wherein the coil is a flat coil attached to the bottom wall and/or the top wall.

5. The vibration motor according to claim 4, wherein the iron core comprises a main body portion disposed in the hollow portion and a fixed end extending from the main body portion toward the coil, and the coil is sleeved over the fixed ends.

6. The vibration motor according to claim 5, wherein the coil comprise a first coil disposed on the top wall and a second coil disposed on the bottom wall, the first coil and the second coil are disposed opposite each other.

7. The vibration motor according to claim 6, wherein the fixed end comprise a first fixed end extending from the main body portion toward the top wall and a second fixed end extending from the main body portion toward the bottom wall, the first coil is sleeved over the first fixed end, and the second coil is sleeved over the second fixed end.

8. The vibration motor according to claim 1, wherein the elastic part is a C-type spring disposed at two sides of the vibrator, and comprises a first fixed portion connected to the vibrator, a second fixed portion connected to the side wall, and a connecting portion connecting the first fixed portion and the second fixed portion.

9. The vibration motor according to claim 8, wherein a length of the first fixed portion is less than a length of the second fixed portion.

10. The vibration motor according to claim 1, wherein the first direction is perpendicular to the second direction.

11. The vibration motor according to claim 1, wherein the elastic part has different rigidity in the first direction and the second direction.

\* \* \* \* \*